(12) United States Patent
Lovicott et al.

(10) Patent No.: US 10,698,457 B2
(45) Date of Patent: Jun. 30, 2020

(54) INFORMATION HANDLING SYSTEM COMPONENT TEMPERATURE REGULATION BASED ON RELIABILITY AND MAXIMUM TEMPERATURE REQUIREMENTS

(71) Applicant: DELL PRODUCTS, L.P., Round Rock, TX (US)

(72) Inventors: Dominick A. Lovicott, Round Rock, TX (US); Clinton A. Powell, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 243 days.

(21) Appl. No.: 15/373,870

(22) Filed: Dec. 9, 2016

(65) Prior Publication Data

US 2018/0164841 A1    Jun. 14, 2018

(51) Int. Cl.
G05D 23/19 (2006.01)
G06F 1/20 (2006.01)

(52) U.S. Cl.
CPC ............ G06F 1/20 (2013.01); G05D 23/1919 (2013.01); G06F 1/206 (2013.01)

(58) Field of Classification Search
CPC .................................................. G05D 23/1917
See application file for complete search history.

(56) References Cited

U.S. PATENT DOCUMENTS

| | | | |
|---|---|---|---|
| 6,573,671 B2 | 6/2003 | Montero et al. | |
| 7,275,380 B2 | 10/2007 | Durant et al. | |
| 7,343,227 B1 | 3/2008 | Artman et al. | |
| 9,192,076 B2 | 11/2015 | Artman et al. | |
| 9,921,624 B1 * | 3/2018 | Okamura | G06F 1/206 |
| 2005/0066672 A1 * | 3/2005 | Yamamoto | G06F 1/206 62/186 |
| 2009/0249109 A1 * | 10/2009 | Aoki | G11B 19/042 713/502 |
| 2014/0277818 A1 | 9/2014 | Peterson et al. | |

(Continued)

OTHER PUBLICATIONS

OnSemiconductor, Remote Thermal Monitor and fan control, Nov. 2016, Rev 11 (Year: 2016).*

(Continued)

*Primary Examiner* — Michael D Masinick
*Assistant Examiner* — Hung H Dang
(74) *Attorney, Agent, or Firm* — Isidore PLLC

(57) ABSTRACT

An Information Handling System (IHS) and method provide for a thermal controller receiving from a temperature sensor a current operating temperature of the at least one functional device. The thermal controller determines a first rate of an air mover based at least in part on the current operating temperature sensed by the temperature sensor and the instantaneous component maximum temperature. The first rate prevents the at least one functional component from exceeding the instantaneous component maximum temperature. The thermal controller determines a second rate of the air mover based at least in part on lifetime average temperature and the long-term average temperature target that is selected for the reliability level. The thermal controller controls the air mover to operate at a higher one of the first and second rates.

20 Claims, 10 Drawing Sheets

(56) References Cited

U.S. PATENT DOCUMENTS

2014/0365793 A1\* 12/2014 Cox ................. G06F 1/206
                                                    713/320
2016/0033972 A1    2/2016 Shabbir et al.
2016/0076544 A1\* 3/2016 Fan .................. F04D 27/004
                                                    700/275
2017/0017280 A1\* 1/2017 Nakanishi ............ G06F 1/20

OTHER PUBLICATIONS

Artman, Paul et al., "Advanced Thermal Control: Optimizing Across Environments and Power Goals", Dell Inc., Feb. 2012.

\* cited by examiner

INFORMATION HANDLING SYSTEM COMPONENT TEMPERATURE REGULATION BASED ON RELIABILITY AND MAXIMUM TEMPERATURE REQUIREMENTS

BACKGROUND

1. Technical Field

This disclosure generally relates to information handling systems (IHSs), and more particular to adjusting air mover settings to thermally cool IHSs.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Customer workloads and associated server component utilization of an IHS are known to vary with time in intensity. Accordingly, thermal controls for IHSs commonly take advantage of this variation to provide lower fan speeds during low or idle activity. The lower fan speeds reduce acoustic noise, reduce power consumption and extend the service life of the cooling fans. Functional components of the IHS thus operate at an increased temperature rather than maintaining the fan speeds at higher rate. Those functional components with the lowest thermal margin can reside for extended periods of time at the temperature set point maintained by the thermal controls. Depending upon the type of component, extended operation at an elevated average temperature can have an unacceptable impact on reliability and service life. Certain functional components suffering quality excursions with thermally sensitive failure mechanisms can be particularly susceptible to failure at this elevated average temperature.

Some generally-known temperature control approaches have, to a certain extent, addressed the reliability of functional components of IHSs. In addition to managing for instantaneous, real-time, component maximum temperature requirements, such temperature control approaches target maintaining average operating temperature below a defined value. The resulting fan speed can include an extended period of time with the fan operating at a maximum fan speed in order to appreciably reduce the average operating temperature. The maximum fan speed can reduce the customer experience due to the higher acoustic noise. Additionally, the maximum fan speed unduly consumes power and causes wear out of the fans.

BRIEF SUMMARY

The illustrative embodiments of the present disclosure provide an information handling system (IHS) having thermal controls that target both (i) an instantaneous (real time) component maximum temperature requirement and (ii) long-term average component temperature with reasonable fan speeds for a long term reliability target. The IHS includes a housing containing one or more thermal-generating components. At least one functional device is contained in the housing and is characterized by: (i) an instantaneous component maximum temperature and (ii) a long-term average temperature target that is selected for a reliability level. The IHS includes an air mover that moves a variable rate of cooling air through the housing to remove thermal energy from the one or more thermal-generating components. The IHS includes a temperature sensor that measures a current operating temperature of the at least one functional device. IHS includes a memory device containing historical data related to average operating temperature of the at least one functional device. IHS includes a thermal controller in communication with the air mover, the temperature sensor, and the memory device. The thermal controller determines a first rate of an air mover based at least in part on the current operating temperature sensed by the temperature sensor and the instantaneous component maximum temperature. The first rate prevents the at least one functional component from exceeding the instantaneous component maximum temperature. The thermal controller determines a second rate of the air mover based at least in part on the lifetime average temperature sensed by the temperature sensor and the long-term average temperature target that is selected for the reliability level. The thermal controller controls the air mover to operate at a higher one of the first and second rates.

According to at least one aspect of the present disclosure, a thermal controller includes a device interface in communication with: (i) an air mover, and (ii) a temperature sensor that measures a current operating temperature of at least one functional device. The thermal controller includes a system interconnect in communication with a memory device containing historical data related to average operating temperature of the at least one functional device. The thermal controller includes a processor subsystem in communication with the device interface and the system interconnect. The process subsystem controls the air mover to move a variable rate of cooling air through a housing of an IHS. The cooling air removes thermal energy from the at least one thermal-generating component. The at least one thermal-generating component is characterized by: (i) an instantaneous component maximum temperature whose exceedance can result in an immediate failure and (ii) a long-term average temperature target that is selected for a long-term reliability level. The thermal controller receives, from the temperature sensor via the device interface, a current operating temperature of the at least one functional device. The thermal controller determines a first rate of an air mover based at least in part on the current operating temperature sensed by the temperature sensor and the instantaneous component maximum temperature. The first rate prevents the at least one functional component from exceeding the instantaneous component maximum temperature. The thermal controller determines a second rate of the air mover based at least in part on the lifetime average temperature sensed by the temperature sensor and the long-term average temperature target that is selected for the reliability level. The thermal controller controls the air mover to operate at a higher one of the first and second rates.

According to at least one aspect of the present disclosure, a method is provided of thermally cooling an IHS. The method includes controlling, by a thermal controller, an air mover for moving a variable rate of cooling air through a housing of an IHS. The cooling air removes thermal energy from at least one thermal-generating component. The at least one thermal-generating component is characterized by: (i) an instantaneous component maximum temperature whose exceedance can result in an immediate failure and (ii) a long-term average temperature target that is selected for a long-term reliability level. The method includes receiving, from a temperature sensor, a current operating temperature of the at least one functional device. Method includes determining a first rate of an air mover based at least in part on the current operating temperature sensed by the temperature sensor and the instantaneous component maximum temperature to prevent the at least one functional component from exceeding the instantaneous component maximum temperature. The method includes determining a second rate of the air mover based at least in part on the lifetime average temperature sensed by the temperature sensor and the long-term average temperature target that is selected for the reliability level. The method includes controlling the air mover to operate at a higher one of the first and second rates.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
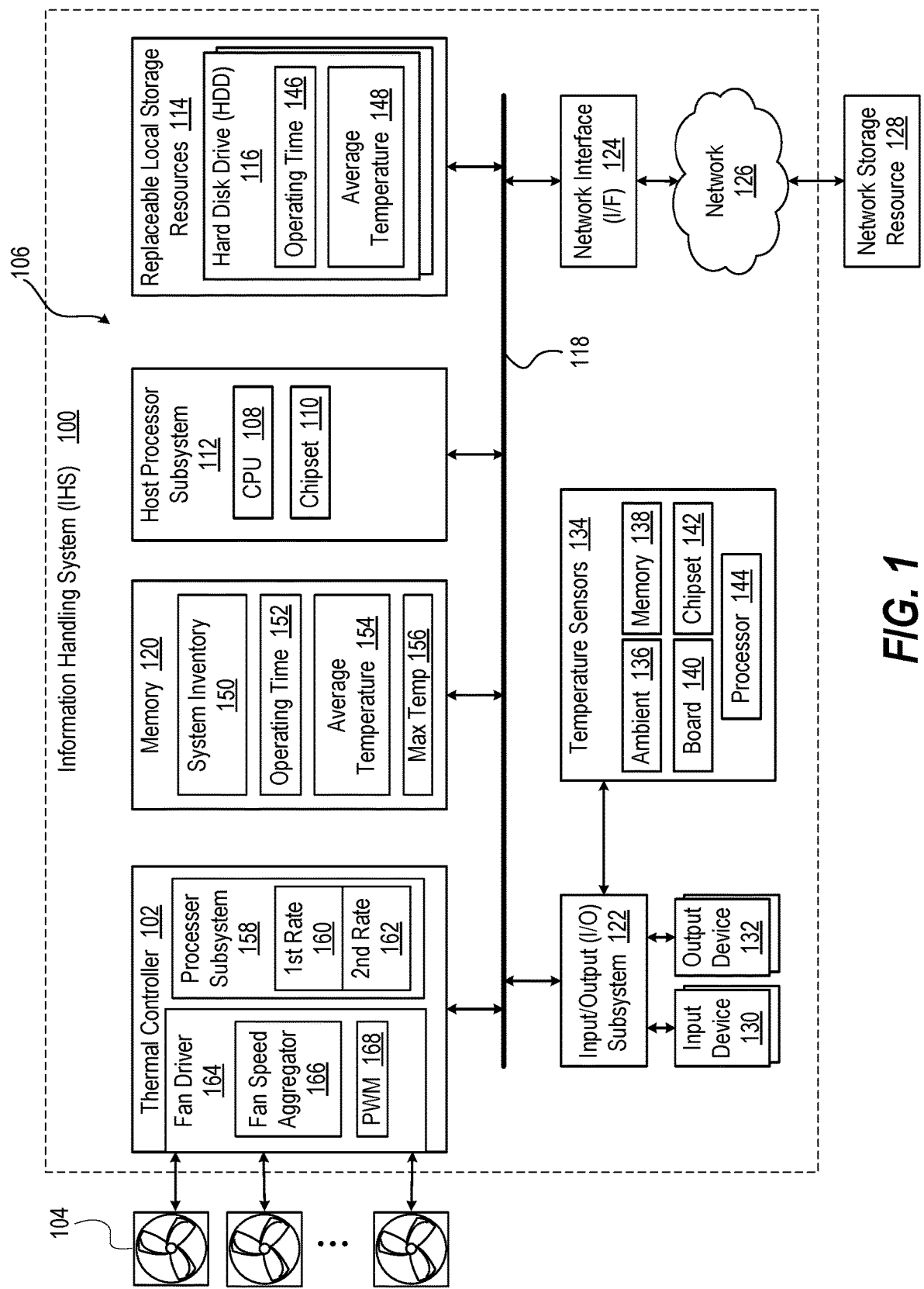
FIG. 1 illustrates a block diagram of an Information Handling System (IHS) having a thermal controller that performs maximum and average temperature regulation, according to one or more embodiments.

According to one or more embodiments, an Information Handling System (IHS) employs a thermal control solution that targets both: (i) an instantaneous (real-time) component maximum temperature requirement and (ii) a long term reliability target based the components average temperature. In one or more exemplary embodiments, reasonable fan speeds limits can be imposed to prevent unacceptable acoustic noise level or to prevent an exceedance of a fan power limit.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates an information handling system (IHS) 100 having a thermal controller 102 of an air mover, such as a blower (not shown) or fan modules 104, that targets both: (i) an instantaneous (real-time) component maximum temperature requirement and (ii) a long term reliability target based on the components average temperature. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one or more embodiments, IHS 100 includes physical components 106 that are characterized by having a maximum component temperature and an average temperature over the component's service life. Physical components 106 may include, but are not limited to, central processing unit (CPU) 108 and chipset 110 of a processor subsystem 112. Another physical component 106 that is subject to maximum and average temperature considerations includes replaceable local storage resources 114 such hard disk drives (HDDs) 116. A system interconnect 118 communicatively couples processor subsystem 112 to various system components including, for example, memory subsystem 120, input/output (I/O) subsystem 122, local storage resource 114, and network interface 124. System bus 118 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 124 is a suitable system, apparatus, or device operable to serve as an interface between IHS 100 and a network 126. Network interface 124 enables IHS 100 to communicate over network 126 using one or more suitable transmission protocols or standards, including, but not limited to, transmission protocols or standards enumerated below with respect to the discussion of network 126. In some embodiments, network interface 126 may be communicatively coupled via network 126 to network storage resource 128. Network 126 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or another appropriate architecture or system that facilitates the communication of signals, data or messages (generally referred to as data). Network 126 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 126 and its various components may be implemented using hardware, software, or any combination thereof.

Processor subsystem 112 comprises a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 112 may interpret and execute program instructions or process data stored locally, for example in memory subsystem 120 or HDDs 116. In the same or alternative embodiments, processor subsystem 112 may interpret and execute program instructions or process data stored remotely, such as in network storage resource 128. In one embodiment, processor subsystem 112 may represent a multi-processor configuration that includes at least a first processor and a second processor.

Memory subsystem 120 comprises a system, device, or apparatus (e.g., computer-readable media) operable to retain retrieved program instructions and data for a period of time. Memory subsystem 120 may comprise random access memory (RAM), electrically erasable programmable read-only memory (EEPROM), a PCMCIA card, flash memory, magnetic storage, opto-magnetic storage, or a suitable selection or array of volatile or non-volatile memory that retains data after power to an associated information handling system, such as IHS 100, is powered down. Local storage resource 114 comprises computer-readable media (e.g., hard disk drive, floppy disk drive, CD-ROM, and/or other type of rotating storage media, flash memory, EEPROM, and/or another type of solid state storage media) and is generally operable to store instructions and data. Likewise, network storage resource 128 comprises computer-readable media (e.g., hard disk drive, floppy disk drive, CD-ROM, or other type of rotating storage media, flash memory, EEPROM, or other type of solid state storage media) and may be generally operable to store instructions and data. In IHS 100, I/O subsystem 122 comprises a system, device, or apparatus generally operable to receive and transmit data to or from or within IHS 100. I/O subsystem 122 may represent, for example, any one or more of a variety of communication interfaces, graphics interfaces, video interfaces, user input interfaces, and peripheral interfaces that communicates wirelessly or via a wired connection to input devices 130 and output devices 132.

Within IHS 100, thermal controller 102 can maintain components 106 below their maximum component temperature based upon a current temperature sensed by one or more temperature sensors 134. In the illustrative embodiment, temperature sensors include ambient temperature sensor 136, memory temperature sensor 138, board temperature sensor 140, chipset temperature sensor 142, and processor temperature sensor 144. The components 106 can track their own average temperature data or the IHS can track this information. For example, each HDD 116 can maintain operating time data 146 and average temperature data 148. For another example, memory subsystem 120 can contain a system inventory 150 with associated operating time data 152, average temperature data 154, and maximum temperature data 156. The thermal controller 102 can include its own processor subsystem 158 that (i) determines a first rate 160 of an air mover such as fan modules 104 based on maintaining maximum temperature regulation and (ii) determines a second rate 162 based upon the average temperature regulation. The processor subsystem 158 can include one or more of the technologies described above for the host processor subsystem 112. A fan driver 164 of the thermal controller 102 can take the maximum of the first and second rates 160, 162 using a fan speed aggregator 166 to drive the fan modules 104 via a pulse width modulation (PWM) component 168.

Figure 2:
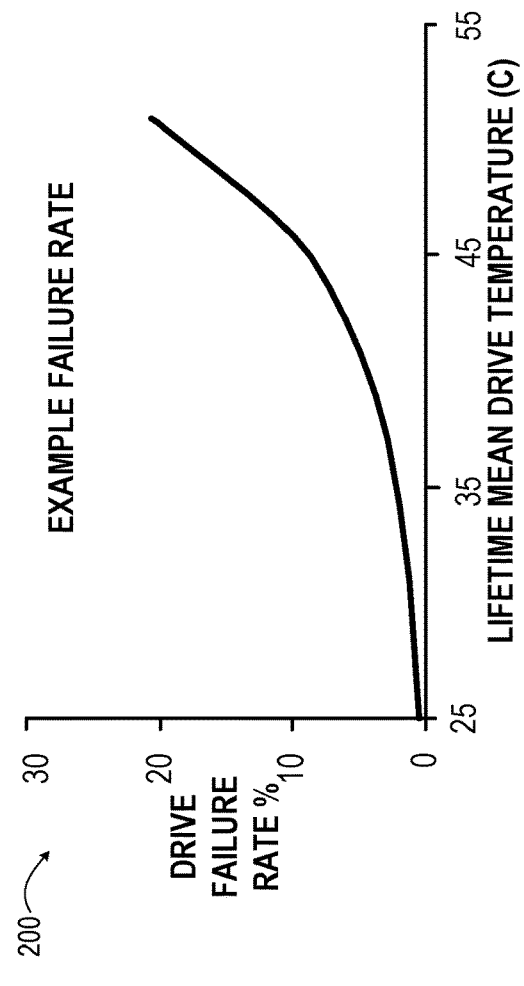
FIG. 2 illustrates a simulated plot of a hard disk drive (HDD) failure rate as a function of lifetime average operating temperature, according to one or more embodiments.

An investigation was conducted to evaluate improving a generally-known thermal control approach that regulates components to a single temperature target. In particular, the generally-known thermal control approach bases the single temperature target on a reliability temperature design point. While largely successful, the inability to prevent quality excursions in certain functional components with thermally sensitive failure mechanisms has been recognized. For example, FIG. 2 illustrates a plot 200 of a HDD population failure rate as a function of lifetime average operating temperature. Plot 200 provides an extreme example of the relationship between HDD component temperature and failure rate. The hardware design point and controls set point for this HDD is 55° C. in this case. Clearly, this set point equates to an unacceptable failure rate. To mitigate excessive failure rates, the lifetime average temperature of the HDDs should be used to employ a reduced thermal control set point.

Thermal control of IHSs for many customer workloads and associated fan responses are believed to maintain cooling based on CPU requirements. CPU is the most common component to drive fan speeds based on thermal margin. At other times, HDD cooling is known to drive fan speeds. While CPU temperature requirements are driving fan speeds, other components can benefit in additional thermal margin and thus lower average temperatures with a reliability meantime between failure (MTBF) benefit. However, if the combination of environment, server cooling architecture, specific customer workload, and component requirements result in HDDs operating at their temperature limits, the HDDs will not enjoy the same average temperatures and will increase their probability of failure.

A need was recognized during the investigation for a thermal control solution that allows targeting both an instantaneous (real time) component maximum temperature requirement and a long-term reliability target. The reliability target is based on the components average temperature, while providing for reasonable fan speeds. It is thus contemplated that a thermal control design should avoid the corner case of never exceeding the MTBF temperature target to account for this type of extreme utilization scenarios. A need was recognized during the investigation for a thermal control solution that allows targeting both an instantaneous (real time) component maximum temperature requirement and a long term reliability target based on the components average temperature, while providing for reasonable fan speeds. In particular, it would be beneficial to have a solution that manages average component temperature independently from maximum instantaneous temperature.

Figure 3:
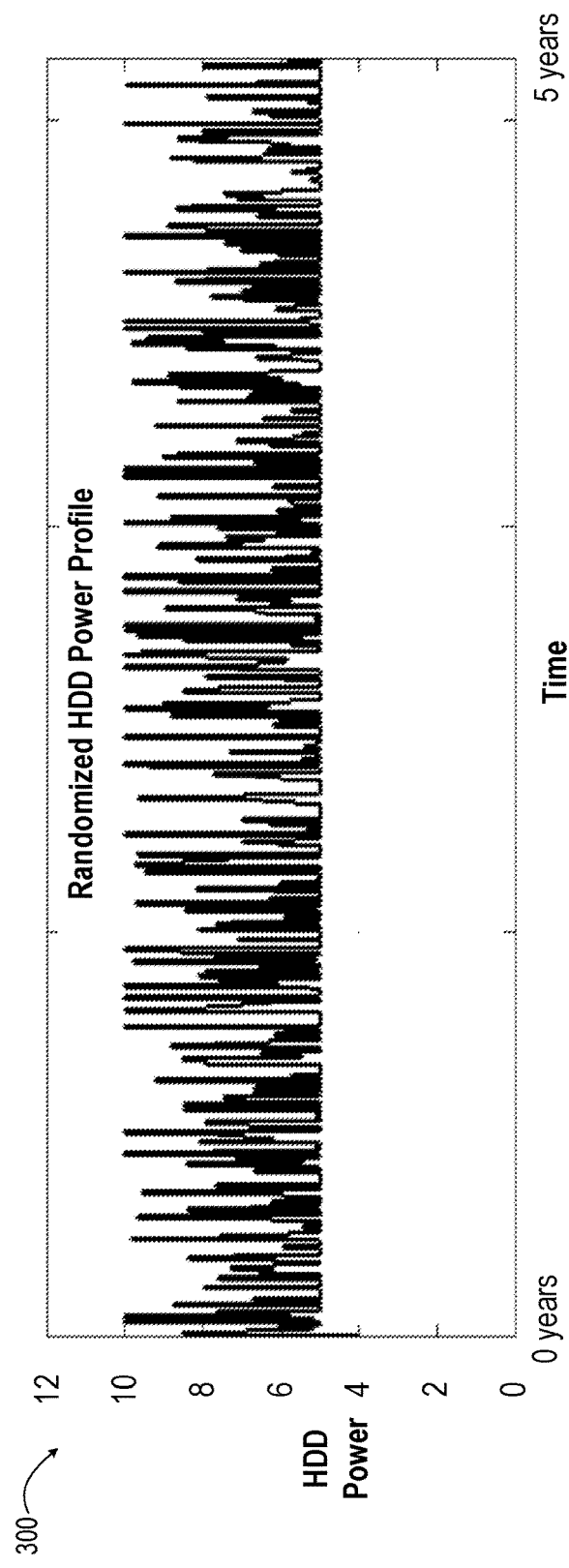
FIG. 3 illustrates a simulated plot of a randomized HDD power profile as a function of time over a period of five (5) years, according to one or more embodiments.
Figure 4:
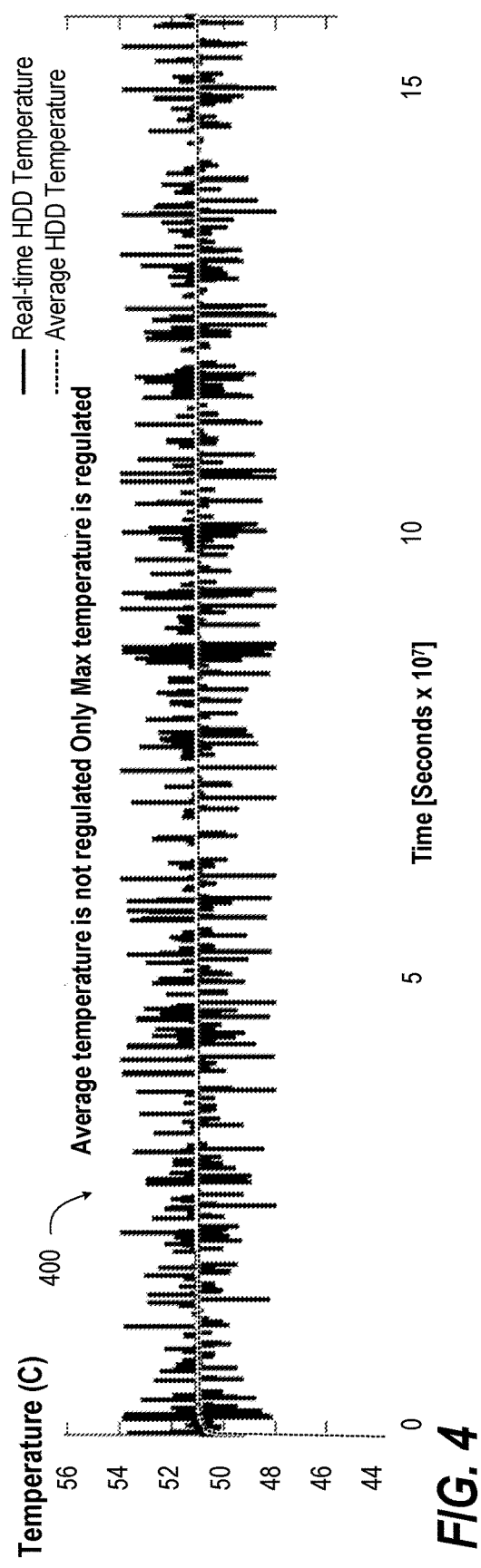
FIG. 4 illustrates a simulated plot of real-time HDD temperature and average HDD temperature over time based upon the randomized HDD power profile.
Figure 5:
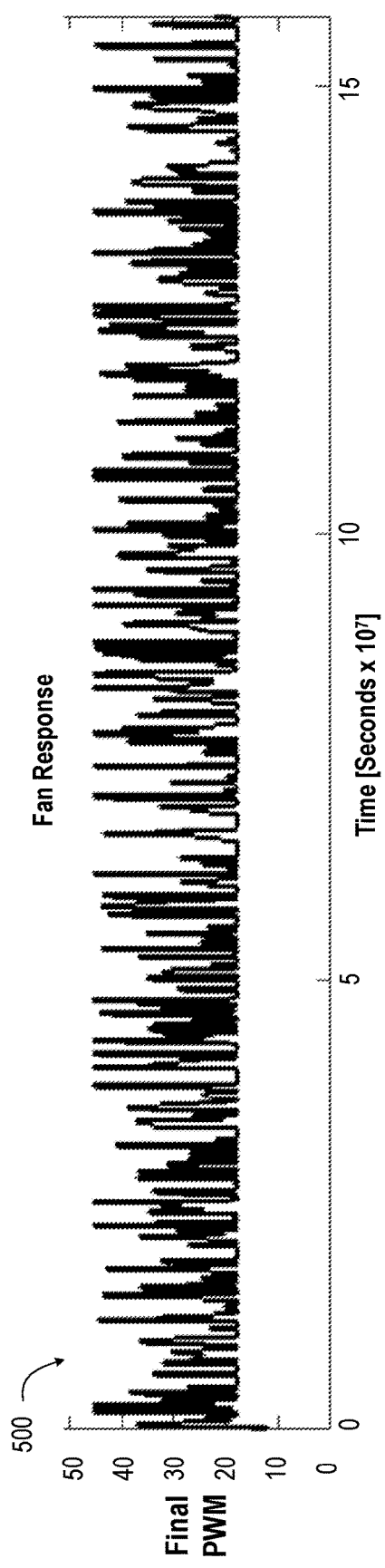
FIG. 5 illustrates a simulated plot for associated fan response to the power and temperature profiles, respectively, of FIGS. 3 and 4 as a final pulse width modulation (PWM) duty cycle as a function of time.

Simulations using SIMULINK modeling were performed to explore the impact of using average temperature control. FIG. 3 illustrates a plot 300 of a randomized HDD power profile as a function of time over a period of five years. The plot 300 was used in subsequent thermal control approaches in subsequent simulations. FIG. 4 illustrates a plot 400 of real-time HDD temperature and average HDD temperature over time based upon the randomized HDD power profile. The thermal control approach was to regulate for only maximum temperature and not for average temperature. FIG. 5 illustrates a plot 500 for associated fan response to the power and temperature profiles respectively of FIGS. 3 and 4 as a final pulse width modulation (PWM) duty cycle as a function of time.

Figure 6:
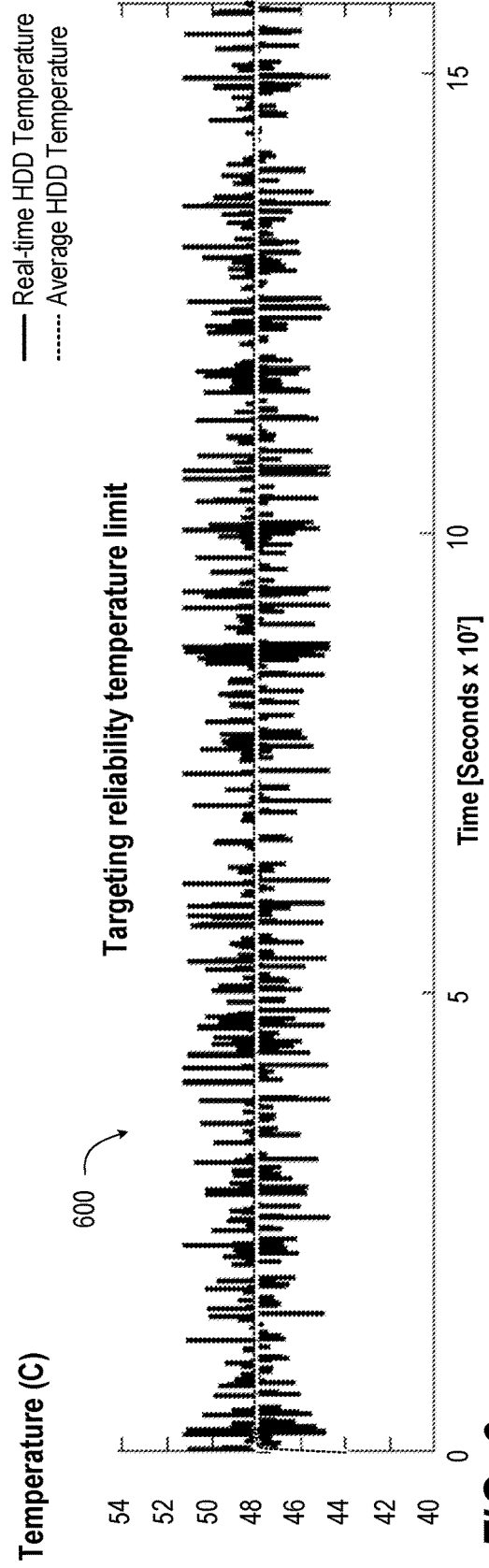
FIG. 6 illustrates a simulated plot of real-time HDD temperature and average HDD temperature over time based upon the randomized HDD power profile.
Figure 7:
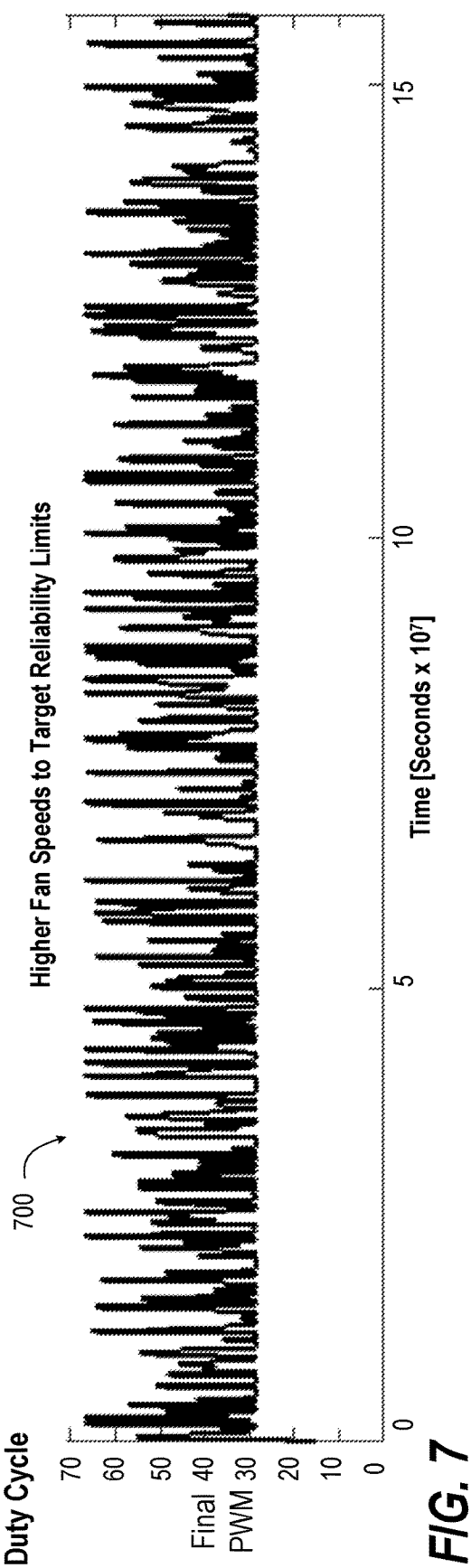
FIG. 7 illustrates a simulated plot for associated fan response to the power and temperature profiles respectively of FIGS. 3 and 6 as a final pulse width modulation (PWM) duty cycle as a function of time.

FIG. 6 illustrates a plot 600 of real-time HDD temperature and average HDD temperature over time based upon the randomized HDD power profile. The closed loop thermal control approach was set to target lower reliability temperature limits. FIG. 7 illustrates a plot 700 for associated fan response to the power and temperature profiles respectively of FIGS. 3 and 6 as a final PWM duty cycle as a function of time. The example fan response directly uses typical feedback temperature control with an average temperature input. The feedback controller quickly regulates fans to full speed to reduce the average temperature. Clearly fan speeds of FIG. 7 are much higher as compared to FIG. 5. The response is far too aggressive to meet fan power and acoustical requirements. Beyond merely using the average component temperature in a closed loop control, review of the fan response indicates that thermal controller design should be altered to prevent the accumulation of fan speed over time. Excessive fan speed that results from such accumulation would create poor customer experience.

Figure 8:
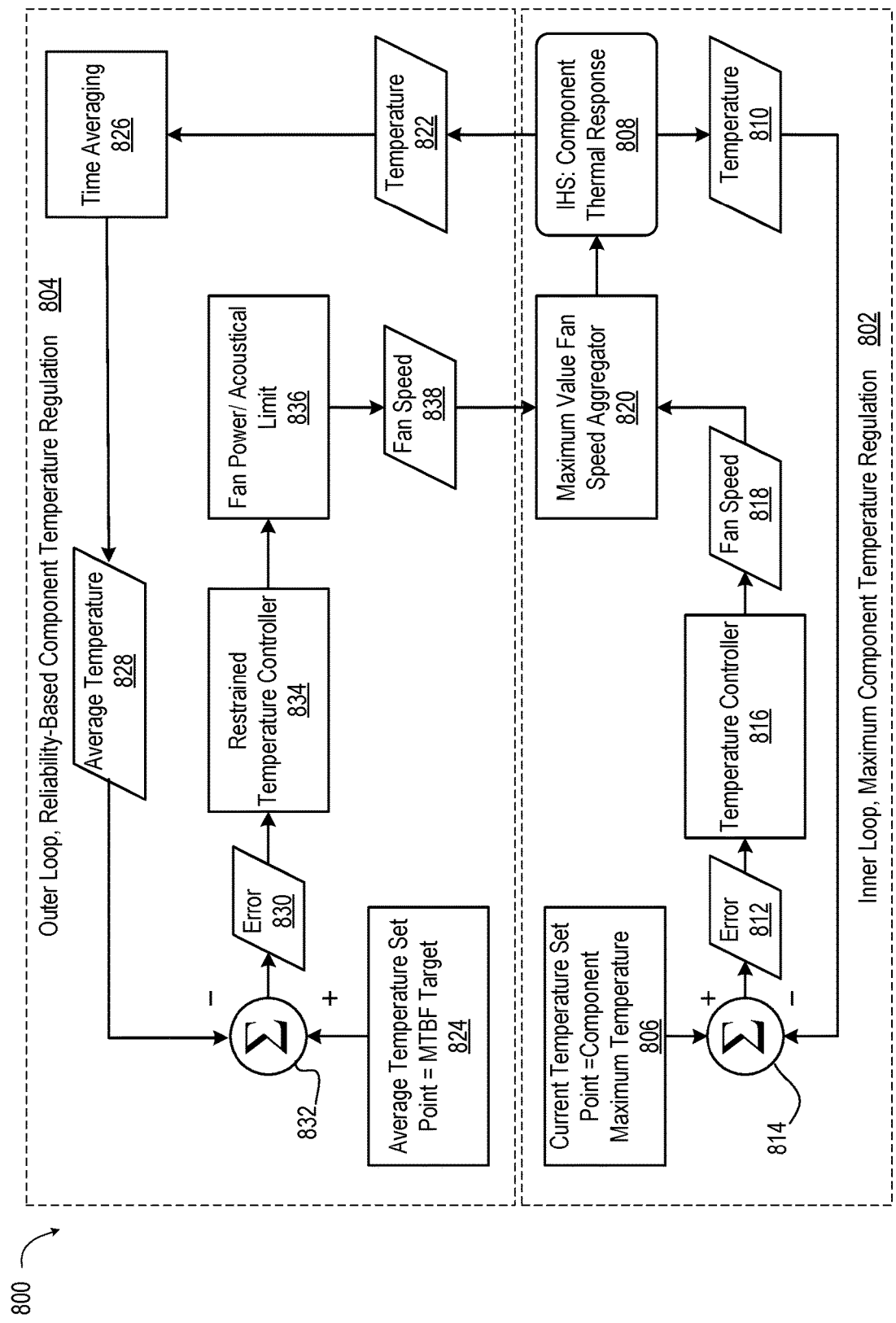
FIG. 8 illustrates a flow diagram of thermal control logic that utilizes an inner loop based upon real-time maximum component temperature regulation and an outer loop that is based upon long-term reliability component temperature regulation, according to one or more embodiments.

FIG. 8 illustrates thermal control logic 800 that utilizes a component average temperature in a unique feedback control loop, in particular a real-time inner loop 802 based upon maximum component temperature regulation and a long-term outer loop 804 that is based on reliability component temperature regulation. The inner loop 802 begins with a current temperature set point 806 that is selected based upon the component maximum temperature. With more than one component that can have different component maximum temperatures, the current temperature set point 806 can correspond to the lowest such maximum temperature. Within an IHS, one or more component produces a thermal response 808 due to current ambient and internal conditions, including current customer workload. Current temperature data 810 is sensed based upon the thermal response 808. An error signal 812 is generated at a summation block 814 for the current temperature set point 806 and the negative of the current temperature data 810. A temperature controller component 816 converts the error signal 812 into a fan speed value 818. Specifically, the fan speed value can be a change in PWM value that is intended to eliminate the error. A fan speed aggregator 820 passes through a maximum value that is received for requested fan speed. This passed through fan speed then affects the thermal response 808 and the inner loop 802 iterates controlling for maximum component temperature.

Outer loop 804 performs reliability-based component temperature regulation for instances in which the thermal response 808 generates a current temperature 822 that is below the current temperature set point 806. Instead, an average temperature set point 824 that is set based upon an MTBF target becomes the basis for temperature regulation. To this end, the current temperature 822 is processed by a time averaging component 826 to produce an average temperature value 828. An error signal 830 is generated at a summation block 832 for the average temperature set point 824 and the negative of the average temperature value 828. A restrained temperature controller component 834 converts the error signal 830 into a requested fan speed. The requested fan speed is limited by a fan power/acoustical limit component 836 to a reliability-based fan speed value 838 that is passed to the fan speed aggregator 820.

Inclusion of the component temperature average allows the thermal control logic 800 to uniquely control MTBF without overly burdening acoustics and fan power consumption. At the same time, transient peak temperatures are managed against the component temperature requirement as opposed to the reliability target.

Control for average temperature can be accomplished in a variety of ways, but the challenge is in designing the controller such that the fan speeds do not ramp to full speed when the average is exceeded. It generally takes a long period of time to reduce the average temperature, but the typical temperature controller operate on the order of seconds, which results in an accumulation of fan speed increases. This accumulation has been shown to quickly ramp to full speed and reside there for extended periods of time (months). Reasonable design targets for the controller can be set to avoid noticeable changes in fan speed. For example the controller design can be optimized to provide a reasonably slow response (e.g. <5% PWM change/month).

In order to restrain the controller, algorithmic provisions can be added to prevent overreaction to the average temperature. One embodiment of the present solution would be to create a long time frame such as weeks, months or years for a net ramp rate limiter. Similarly, current PowerEdge fan control has ramp rate limit for a short time frame (e.g., 1 second interval). The proposed scheme is an enhancement to legacy temperature controllers and has been shown to be effective for different controller types (e.g. proportional-integral-derivative controller (PID) controller, fuzzy logic, etc.). An alternative embodiment provides an algorithm that slowly adjusts the peak temperature target based on the average component temperature within the existing controls scheme.

Figure 9:
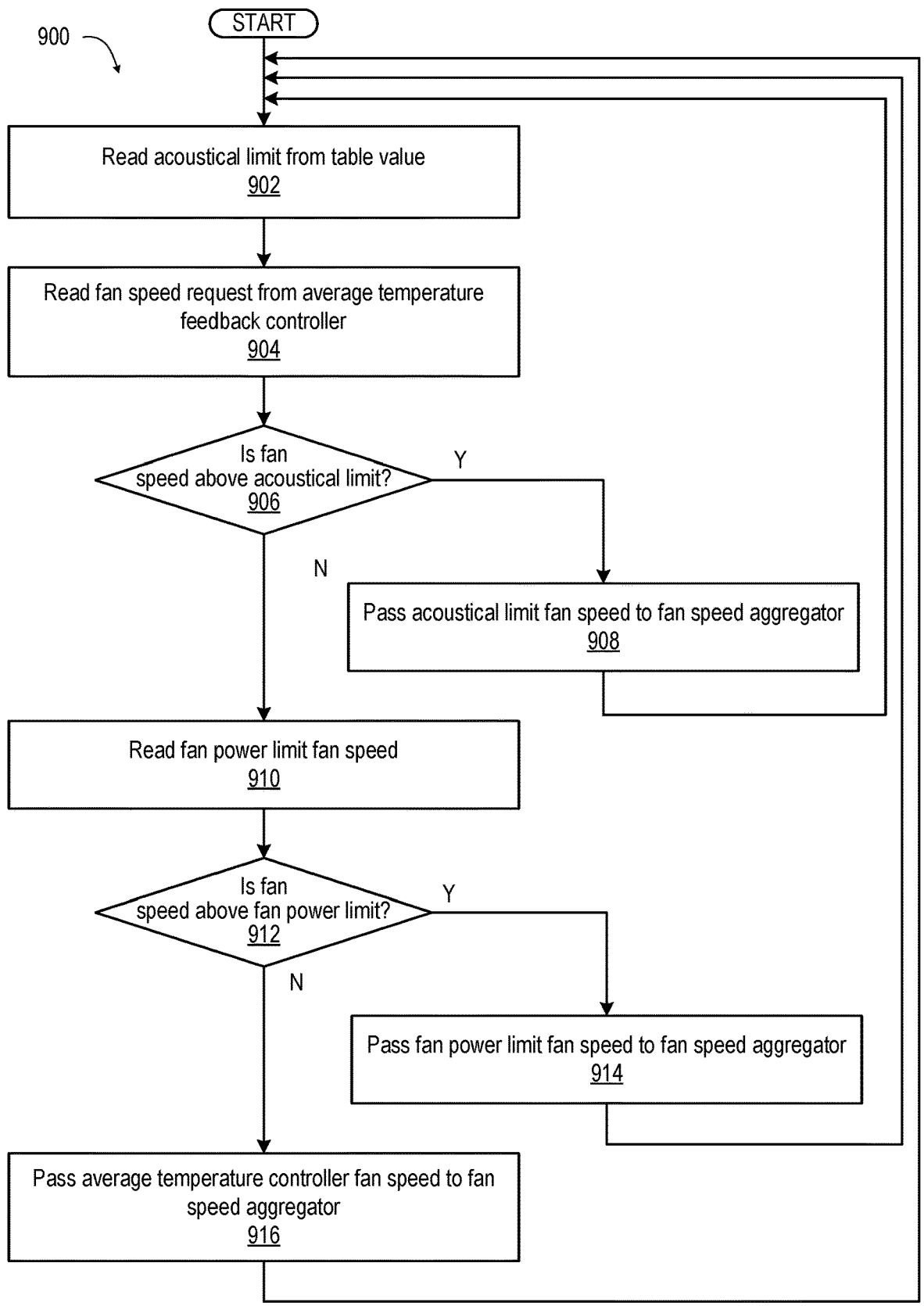
FIG. 9 illustrates a flow diagram of a method of thermal control of an IHS that addresses acoustic and performance limits of cooling fans while performing reliability-based fan speed regulation, according to one or more embodiments.

FIG. 9 illustrates a method 900 of thermal control of an IHS that addresses acoustic and performance limits of cooling fans. In one or more embodiments, method 900 includes reading a fan speed associated with an acoustical limit from a table value (block 902). Method 900 includes receiving fan speed request from average temperature feedback controller (block 904). Method 900 includes determining whether the fan speed generates an acoustics output that is above an acoustical limit (decision block 906). In response to determining that the fan speed is above an acoustical limit in decision block 906, method 900 includes forwarding the acoustical limit fan speed to a fan speed aggregator (block 908). Then method 900 returns to block 902 to continue monitoring current temperature. In response to determining in decision block 906 that the fan speed is not above an acoustical limit, method 900 includes reading a fan speed limit that is associated with a maximum fan power producible by the fan module/s (block 910). Method 900 includes determining whether the fan speed is above the fan power limit (decision block 912). In response to determining in decision block 912 that the fan speed is above the fan power limit, method 900 includes forwarding the fan power limit fan speed to the fan speed aggregator (block 914). Then method 900 returns to block 902 to continue monitoring current temperature. In response to determining that the fan speed is not above the fan power limit in decision block 912, method 900 includes passing an average temperature controller fan speed to fan speed aggregator (block 916). Then method 900 returns to block 902 to continue monitoring current temperature.

Accessing mean temperature data for the various functional components of an IHS can be performed in more than one way. For example, HDDs employ an internal thermal sensor or thermistor. IHS can poll a current temperature of a selected HDD, although there is generally no specification or SAS/SATA industry standard governing the aggregation and reporting of mean temperature over the service life of an HDD.

In one embodiment, an OEM of an IHS or an industry standard can specify for drive suppliers how to calculate, log, and report mean temperature data along with Power On Hours (POH) for each HDD or other functional component. The logged data can follow the drive as installed into a particular IHS. Distributing data collection can also lessen host-side data handling overhead.

In one embodiment, current temperature for an HDD or other functional component can be polled by a host IHS that also calculates and logs the reliability-related data. Such a centralized implementation can allow backward compatibility with functional components that do not perform this function. In one or more embodiments, both approaches can coexist in the same IHS.

In one embodiment, control policies are implemented related to field service of the component. The following polices are examples based on HDD replacement:

A new or redeployed HDD can have a very different average temperature value than other HDDs in a particular IHS. For short POH HDDs, short excursions can cause the average temperature value to change significantly. For redeployed HDDs, the average temperature value can be at a significantly different level than the existing HDDs in the IHS. A significant period of time in the IHS would be required to adjust the average temperature value for the redeployed HDD. Thus, the longer that a particular HDD is deployed in one or more IHSs, the HDD becomes associated with richer and more stable mean temperature metrics. In order to prevent a new HDD that is added to an existing array becoming the outlier average temperature value that overexcites a fan speed response, a POH value for each HDD could be monitored. Upon entering service, the HDD would be included in a peak temperature control loop to prevent failure due to the HDD exceeding maximum component temperature. However, the HDD can be excluded from the average temperature-based control loop until the POH value for the HDD surpasses a threshold, such as 1000 hours.

Second, once a newly added HDD satisfies the POH criteria, the HDD can still be indefinitely excluded from the average temperature-based control loop due to the HDD failing to conform to a logging and reporting standard. A nonconforming drive might be one that: (i) does not report mean temperature or (ii) is a different drive family type than the one that was replaced. For example, the replacement HDD can have a different power/thermal profile such as servicing a 3.5" HDD failure with a lower power 2.5" HDD inserted in an adapter.

Third, the control policy can pertain to an HDD that has lived in a different IHS and thus has significantly different mean temperature history onboard. For example, a customer may move drives between IHSs in their data center. In this case, the new drive could be monitored and eventually included in the average temperature control loop once the mean temperature of the new drive approaches that of the rest of the drive array.

Figure 10:
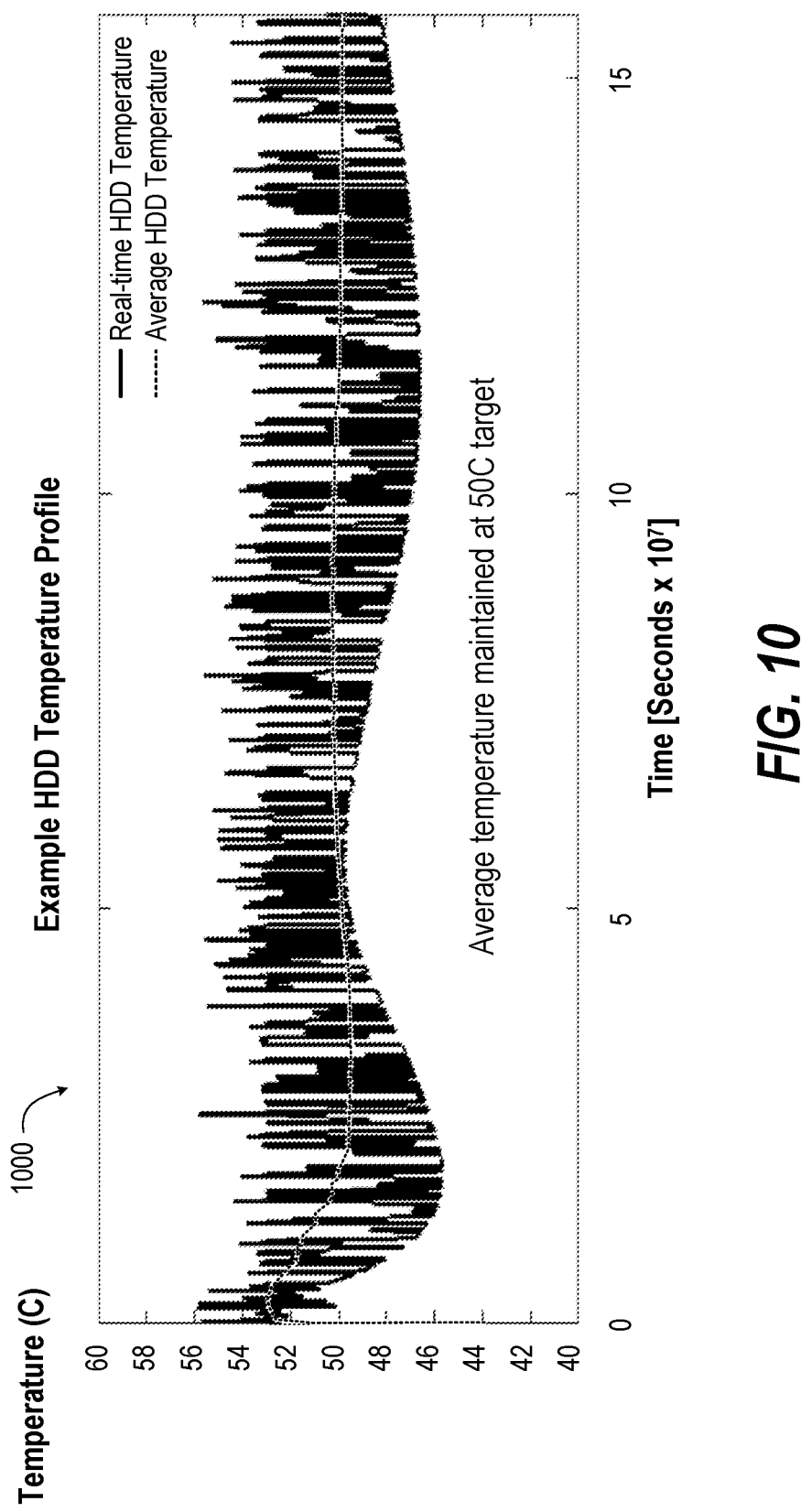
FIG. 10 illustrates a simulated plot of real-time and average HDD temperature as a function of time by maintaining average temperature at 50° C. target and maximum temperature target at 55° C. for a period of five (5) years, according to one or more embodiments.
Figure 11:
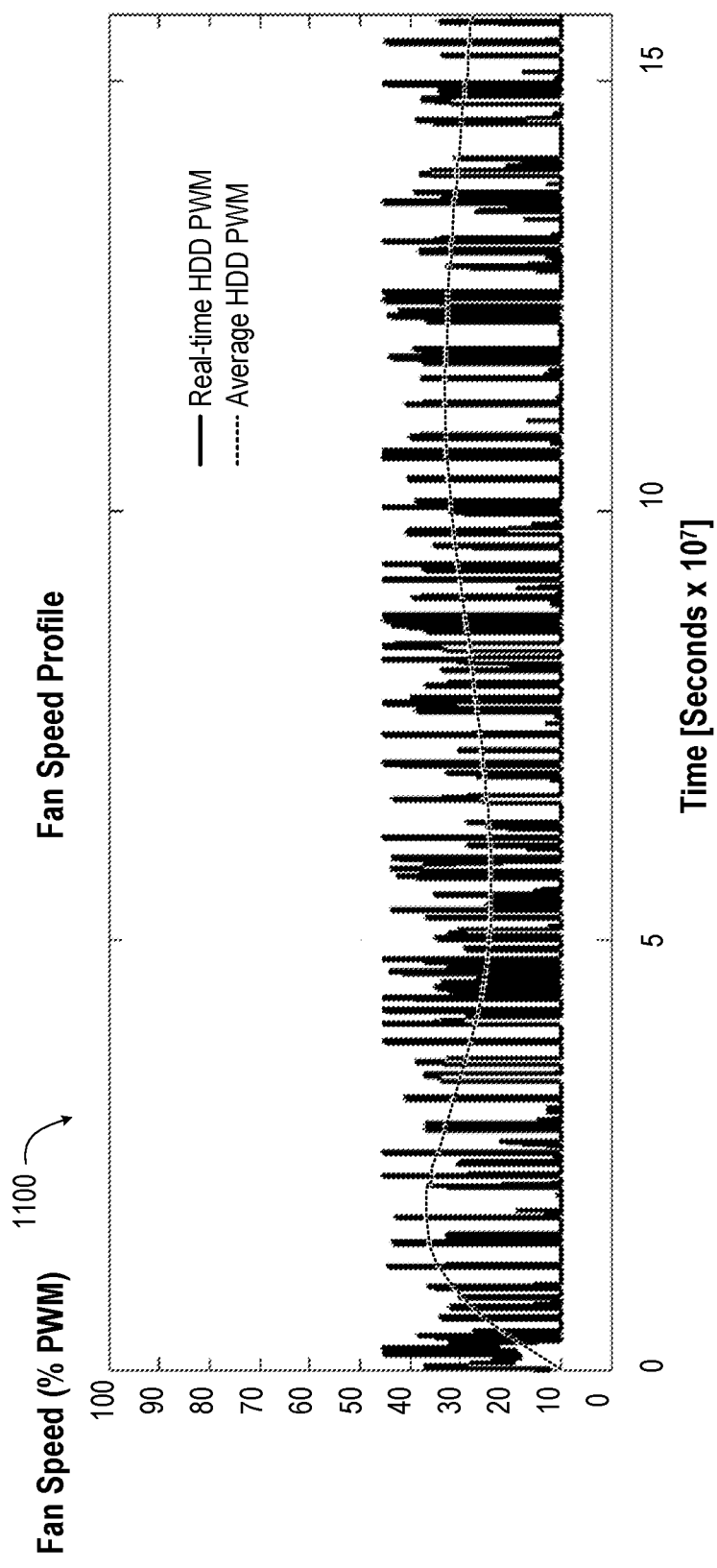
FIG. 11 illustrates a simulated plot of fan speed profile as a function of time, according to one or more embodiments.
Figure 12:
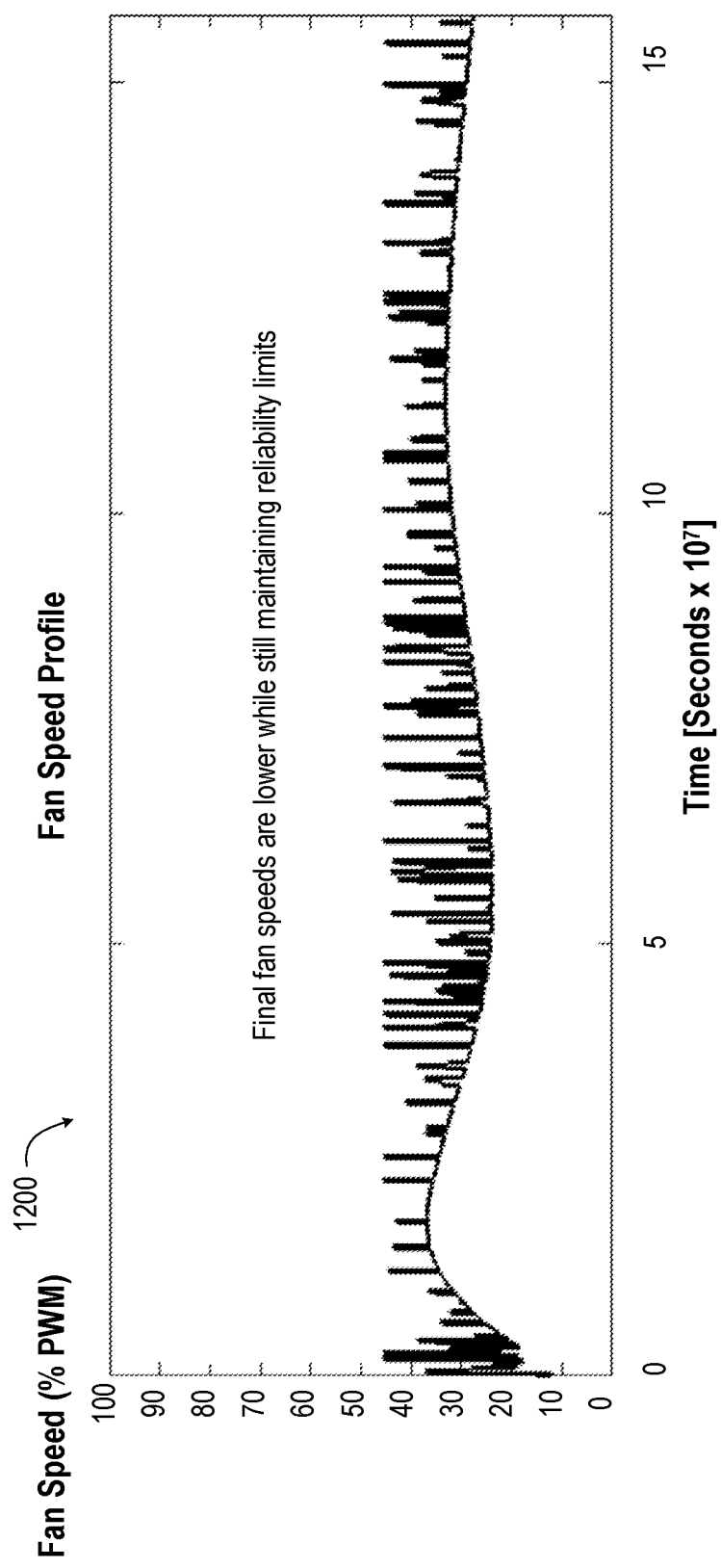
FIG. 12 illustrates a simulated plot aggregating a maximum of the two fan speeds of FIG. 11, according to one or more embodiments.

Simulation results were also generated for using reliability-based thermal control according to aspects of the present innovation. Modeling by SIMULINK used characterized thermal models to predict controller behavior. FIG. 10 illustrates a plot 1000 of real-time and average HDD temperature as a function of time by maintaining average temperature at 50° C. target and maximum temperature target at 55° C. for a period of five (5) years. FIG. 11 illustrates a plot 1100 of a calculated fan speed driven by real-time temperature overlaid on fan speed driven by average temperature. FIG. 12 illustrates a plot 1200 aggregating a maximum of the two fan speeds of FIG. 11 according to the present innovation. Based on these plotted results, it is clear that the present solution can regulate maximum component temperatures separately from reliability targets. The present solution uniquely handles thermal cooling situations that require a moderate response to real time workload with improved power and acoustical performance while achieving component reliability targets. In particular, the present innovation provides for restraining a closed loop controller to regulate average component temperature with acceptably subtle acoustical response characteristics. In addition, a combined control system balances control of both peak and average component temperature to enforce short term and long term reliability requirements. Further, control policies can exempt components from average temperature control based on "Power On Hours" or field replacement status.

Figure 13:
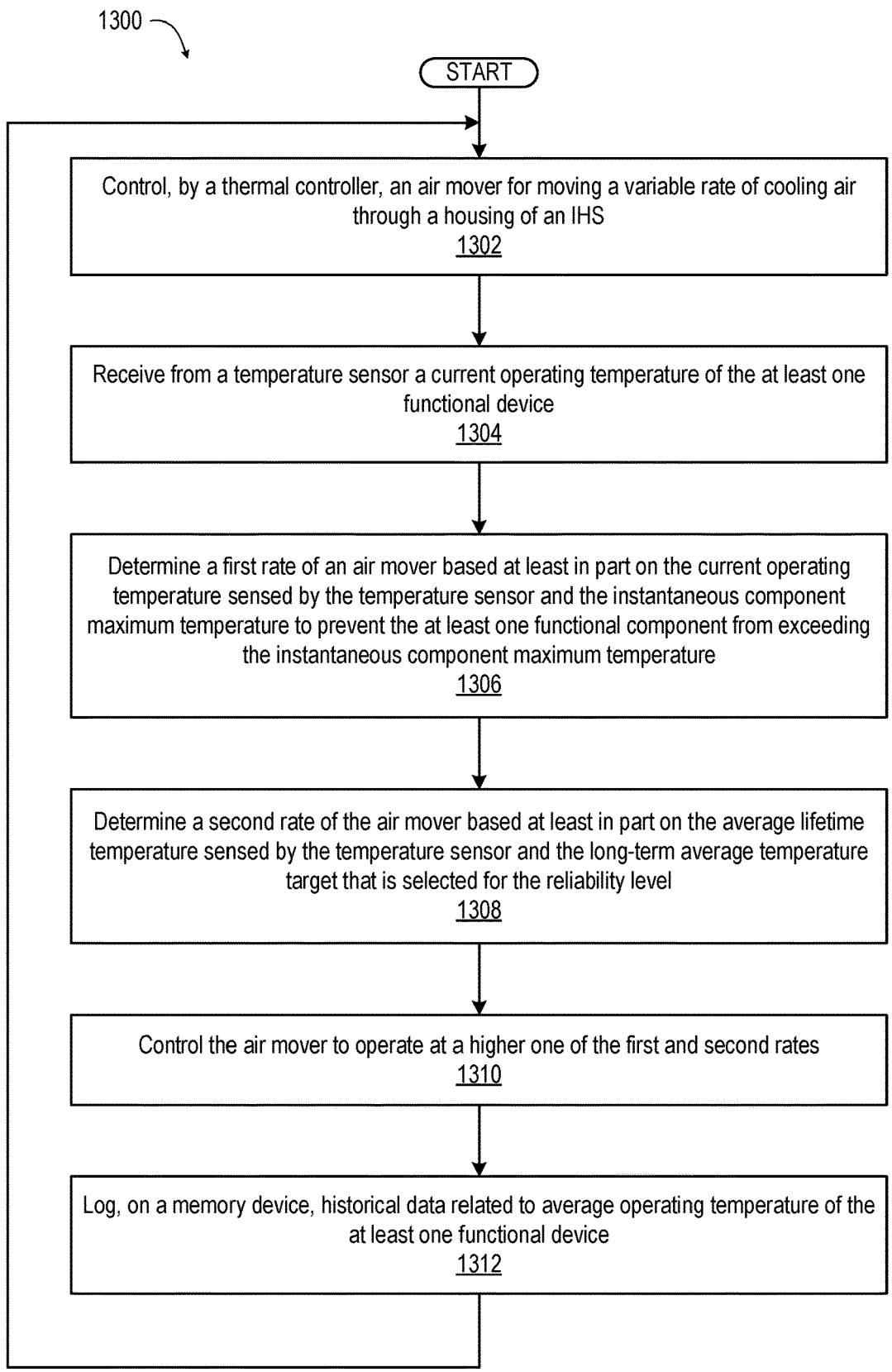
FIG. 13 illustrates a method for targeting both (i) an instantaneous (real time) component maximum temperature requirement and (ii) long-term average component temperature with reasonable fan speeds for a long term reliability target, according to one or more embodiments.

FIG. 13 illustrates a method 1300 for targeting both (i) an instantaneous (real time) component maximum temperature requirement and (ii) long-term average component temperature with reasonable fan speeds for a long term reliability target. In one or more embodiments, method 1300 includes controlling, by a thermal controller, an air mover for moving a variable rate of cooling air through a housing of an IHS (block 1302). The cooling air removes thermal energy from at least one thermal-generating component characterized by: (i) an instantaneous component maximum temperature and (ii) a long-term average temperature target that is selected for a reliability level. Method 1300 includes receiving, from a temperature sensor, a current operating temperature of the at least one functional device (block 1304). Method 1300 includes determining a first rate of an air mover based at least in part on the current operating temperature sensed by the temperature sensor and the instantaneous component maximum temperature to prevent the at least one functional component from exceeding the instantaneous component maximum temperature (block 1306). Method 1300 includes determining a second rate of the air mover based at least in part on the average lifetime temperature and the long-term average temperature target that is selected for the reliability level (block 1308). Method 1300 includes controlling the air mover to operate at a higher one of the first and second rates (block 1310). Method 1300 includes logging, on a memory device, historical data related to average operating temperature of the at least one functional device (block 1312). Then method 1300 returns to block 1302 to continue performing thermal control.

In one or more embodiments, method 1300 includes determining a second rate that is less than the first rate by determining a lowest value of a fan speed associated with one of a group consisting of: (i) an acoustical limit, (ii) a fan power limit; and (iii) the long-term average temperature target. In one or more embodiments, the average temperature target can be limited to functional components having historical operating data above a threshold amount of operating time. Method 1300 includes controlling the air mover to operate at the second rate determined, based at least in part on, the long-term average temperature target and according to a net ramp limit. The net ramp limit can allow a change in temperature set point to happen over a period measured in hours, days, weeks, or months to prevent rapid fan speed changes that would reduce a customer experience.

In the above described flow charts of FIGS. 9 and 13, one or more of the methods may be embodied in an automated control system that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An information handling system (IHS) comprising:
   one or more thermal-generating components;
   at least one functional device characterized by: (i) an instantaneous component maximum temperature and (ii) a long-term average temperature target that is selected for a reliability level;
   an air mover that moves a variable rate of cooling air across the components to remove thermal energy from the one or more thermal-generating components;
   a temperature sensor to measure a current operating temperature of the at least one functional device;
   a memory device containing historical data related to average operating temperature of the at least one functional device; and
   a controller in communication with the air mover, the temperature sensor, and the memory device, and which implements a thermal control solution that allows targeting both the instantaneous component maximum temperature and a long-term reliability target that is based on an average temperature of the at least one functional device, while providing for fan speeds that prevent at least one of unacceptable acoustic noise level or an exceedance of a fan power limit, wherein the controller:
   determines, in real time, a first rate of an air mover based at least in part on the current operating temperature sensed by the temperature sensor and the instantaneous component maximum temperature to prevent the at least one functional device from exceeding the instantaneous component maximum temperature;
   determines a second rate of the air mover based at least in part on lifetime average temperature and the long-term average temperature target that is selected for the reliability level, wherein, in determining the second rate, a requested fan speed is generated and limited by a fan power/acoustical limit component to a reliability-based fan speed value that is passed to a fan speed aggregator as the second rate along with the first rate, and wherein the controller determines average component temperatures independently from the instantaneous component maximum temperature; and
   controls a rate of speed of the air mover by selecting, via the fan speed aggregator, a higher one of the first and second rates to operate the air mover to provide cooling air to the IHS.

2. The IHS of claim 1, wherein the controller determines the second rate to be a lowest value of a fan speed associated with one of a group consisting of: (i) an acoustical limit, (ii) a fan power limit; and (iii) the long-term average temperature target.

3. The IHS of claim 1, wherein the memory device resides in the at least one functional device, which further comprises a device controller that logs the historical data on the memory device.

4. The IHS of claim 1, wherein:
   the at least one functional device comprise more than one replaceable functional components; and
   the controller determines the second rate based on the highest respective average operating temperature for a selected one of the more than one replaceable functional components.

5. The IHS of claim 4, wherein the controller determines the second rate by including any one of the more than one replaceable functional components having historical data of at least a minimum operating time threshold.

6. The IHS of claim 4, wherein the controller determines the second rate by including any one of the more than one replaceable functional components that are detected to have spent their entire service life installed in the IHS.

7. The IHS of claim 4, wherein the controller determines the second rate by including any one of the more than one replaceable functional components that are detected to be of a selected type of functional component.

8. The IHS of claim 1, wherein the controller adjusts the second rate according to a net ramp rate limitation having a time interval selected to prevent rapid fan speed changes.

9. The IHS of claim 1, wherein the controller determines the second rate based at least in part on a selected one of a fan acoustic limit and a fan power limit.

10. A method for controlling an air mover of an information handling system (IHS) having the air mover for moving a variable rate of cooling air through a housing of the HIS to remove thermal energy from at least one thermal-generating component characterized by: (i) an instantaneous component maximum temperature and (ii) a long-term average temperature target that is selected for a reliability level, the method comprising:
   implementing, via a controller of the air mover, a thermal control solution that enables targeting both an instantaneous component maximum temperature requirement and a long-term reliability target that is based on an average temperature of at least one functional device, while providing for fan speeds that prevent at least one of unacceptable acoustic noise level or an exceedance of a fan power limit, wherein the implementing comprises:

receiving from a temperature sensor a current operating temperature of the at least one functional device;

determining, in real time, a first rate of an air mover based at least in part on the current operating temperature sensed by the temperature sensor and the instantaneous component maximum temperature to prevent the at least one functional device from exceeding the instantaneous component maximum temperature;

determining a second rate of the air mover based at least in part on lifetime average temperature and the long-term average temperature target that is selected for the reliability level, wherein, determining the second rate comprises generating a requested fan speed and limiting the requested fan speed by a fan power/acoustical limit component to a reliability-based fan speed value that is passed to a fan speed aggregator as the second rate along with the first rate, and wherein the controller determines average component temperatures independently from the instantaneous component maximum temperature; and controlling a rate of speed of the air mover by selecting a higher one of the determined first and second rates to operate the air mover to provide cooling air to cool the IHS.

11. The method of claim 10, wherein determining the second rate comprises determining a lowest value of a fan speed associated with one of a group consisting of: (i) an acoustical limit, (ii) a fan power limit; and (iii) the long-term average temperature target.

12. The method of claim 10, further comprising logging, by a device controller of the at least one functional device, historical data on a memory device residing in the at least one functional device and related to average operating temperature of the at least one functional device.

13. The method of claim 10, further comprising:
logging, by the controller, historical data for more than one replaceable functional components on a system memory device; and
determining the second rate based on a highest respective average operating temperature for a selected one of the more than one replaceable functional components.

14. The method of claim 13, wherein determining the second rate comprises including any one of the more than one replaceable functional components having historical data of at least a minimum operating time threshold.

15. The method of claim 10, further comprising adjusting the second rate according to a net ramp rate limitation having a time interval of more than a week.

16. The method of claim 10, wherein determining the second rate comprises limiting fan speed based at least in part on a selected one of a fan acoustic limit and a fan power limit.

17. A thermal controller of an information handling system (IHS), the thermal controller comprising:
a device interface in communication with: (i) an air mover and (ii) a temperature sensor that measures a current operating temperature of at least one functional device, wherein the air mover moves a variable rate of cooling air through the IHS, removing thermal energy from at least one thermal-generating component characterized by: (i) an instantaneous component maximum temperature; and (ii) a long-term average temperature target that is selected for a reliability level;

a system interconnect in communication with a memory device containing historical data related to average operating temperature of the at least one functional device; and a processor subsystem in communication with the device interface and the system interconnect, and which:
implements a thermal control solution that allows targeting both an instantaneous component maximum temperature requirement and a long-term reliability target that is based on an average temperature of the at least one functional device, while providing for fan speeds that prevent at least one of unacceptable acoustic noise level or an exceedance of a fan power limit, wherein the controller:

receives from the temperature sensor via the device interface a current operating temperature of the at least one functional device;

determines, in real time, a first rate of an air mover based at least in part on the current operating temperature sensed by the temperature sensor and the instantaneous component maximum temperature to prevent the at least one functional device from exceeding the instantaneous component maximum temperature;

determines a second rate of the air mover based at least in part on lifetime average temperature and the long-term average temperature target that is selected for the reliability level, wherein, in determining the second rate, a requested fan speed is generated and limited by a fan power/acoustical limit component to a reliability-based fan speed value that is passed to a fan speed aggregator as the second rate along with the first rate, and wherein the controller determines average component temperatures independently from the instantaneous component maximum temperature; and controls a rate of speed of the air mover by selecting a higher one of the first and second rates to operate the air mover to provide cooling air to cool the IHS.

18. The thermal controller of claim 17, wherein the controller determines the second rate by determining a lowest value of a fan speed associated with one of a group consisting of: (i) an acoustical limit, (ii) a fan power limit; and (iii) the long-term average temperature target.

19. The IHS of claim 1, wherein the controller:
performs a reliability-based component temperature regulation in response to a thermal response generating a current temperature that is below a current temperate set point, wherein the controller:
sets an average temperature set point based on a reliability meantime between failure (MTBF) target, wherein the controller uses the average temperature set point as a basis for temperature regulation;
processes the current temperature by a time averaging component to produce an average temperature value;
generates an error signal by summing the average temperature set point and a negative of the average temperature value; and
converts, via a temperature controller component, the error signal into the requested fan speed, the requested fan speed being limited by a fan power/ acoustical limit component to a reliability-based fan speed value that is forwarded to the fan speed aggregator, which passes through a maximum value that is received for requested fan speed.

20. The IHS of claim 19, wherein the controller includes the component temperature average to uniquely control MTBF without burdening acoustics and fan power consumption.

* * * * *

UNITED STATES PATENT AND TRADEMARK OFFICE
CERTIFICATE OF CORRECTION

| | |
|---|---|
| PATENT NO. | : 10,698,457 B2 |
| APPLICATION NO. | : 15/373870 |
| DATED | : June 30, 2020 |
| INVENTOR(S) | : Dominick A. Lovicott and Clinton A. Powell |

Page 1 of 1

It is certified that error appears in the above-identified patent and that said Letters Patent is hereby corrected as shown below:

In the Claims

Column 14, Claim 10, Line 60, after "housing of the" delete "HIS" and insert --IHS--.

Signed and Sealed this
Tenth Day of August, 2021

Drew Hirshfeld
*Performing the Functions and Duties of the
Under Secretary of Commerce for Intellectual Property and
Director of the United States Patent and Trademark Office*